(12) United States Patent
Nakai et al.

(10) Patent No.: US 10,916,864 B2
(45) Date of Patent: Feb. 9, 2021

(54) ELECTRICAL CONDUCTION PATH

(71) Applicant: SUMITOMO WIRING SYSTEMS, LTD., Yokkaichi (JP)

(72) Inventors: Hirokazu Nakai, Yokkaichi (JP); Ryo Fujioka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/621,906

(22) PCT Filed: Jul. 5, 2018

(86) PCT No.: PCT/JP2018/025438
§ 371 (c)(1),
(2) Date: Dec. 12, 2019

(87) PCT Pub. No.: WO2019/021780
PCT Pub. Date: Jan. 31, 2019

(65) Prior Publication Data
US 2020/0119465 A1   Apr. 16, 2020

(30) Foreign Application Priority Data

Jul. 26, 2017 (JP) .................................. 2017-144312

(51) Int. Cl.
*H01R 4/18* (2006.01)
*H01R 4/20* (2006.01)
(Continued)

(52) U.S. Cl.
CPC ............... *H01R 4/20* (2013.01); *H01R 4/183* (2013.01); *H02G 3/04* (2013.01); *H01R 4/029* (2013.01);
(Continued)

(58) Field of Classification Search
CPC .......... H01R 4/20; H01R 4/183; H01R 4/029; H02G 3/04; H02G 15/105; H02G 15/068; B60R 16/0215
See application file for complete search history.

(56) References Cited

U.S. PATENT DOCUMENTS 3,777,050 A * 12/1973 Silva .................... H02G 15/188
174/78
4,565,417 A *  1/1986 Dussel ................. H01R 9/0512
439/275
(Continued)

FOREIGN PATENT DOCUMENTS

| JP | H2-104709 U | 8/1990 |
| JP | 2007-087628 A | 4/2007 |
| JP | 2009-214631 A | 9/2009 |

OTHER PUBLICATIONS

Sep. 11, 2018 International Search Report issued in International Patent Application No. PCT/JP2018/025438.

*Primary Examiner* — Steven T Sawyer
(74) *Attorney, Agent, or Firm* — Oliff PLC

(57) ABSTRACT

An electrical conduction path that includes a first conductor; a tubular first insulator that encloses the first conductor; a tubular second conductor that encloses the first insulator, and has shape retainability; a branch conductor that is flexible so as to be deformable into a compact elongated shape and into an expanded tubular shape, the branch conductor deformed into the expanded tubular shape enclosing an outer circumferential surface of the second conductor; and a fixing member that fixes the branch conductor to the outer circumferential surface of the second conductor.

4 Claims, 3 Drawing Sheets

(51) Int. Cl.
*H02G 3/04* (2006.01)
*H01R 4/02* (2006.01)
*H02G 15/105* (2006.01)
*H02G 15/068* (2006.01)

(52) U.S. Cl.
CPC ......... *H02G 15/068* (2013.01); *H02G 15/105* (2013.01)

(56) References Cited

U.S. PATENT DOCUMENTS

| | | | | |
|---|---|---|---|---|
| 5,028,742 | A * | 7/1991 | Redman | H02G 15/105 174/88 R |
| 5,866,843 | A * | 2/1999 | Ikeda | B60R 16/0215 174/36 |
| 6,559,376 | B2 * | 5/2003 | Funk | F02P 9/002 174/28 |
| 2014/0251682 | A1 | 9/2014 | Ichikawa et al. | |
| 2016/0071630 | A1 * | 3/2016 | Sugino | H01R 4/021 174/68.3 |
| 2016/0295755 | A1 | 10/2016 | Lee et al. | |
| 2017/0365937 | A1 * | 12/2017 | Juillet | H01R 9/034 |

* cited by examiner

ELECTRICAL CONDUCTION PATH

BACKGROUND

The present disclosure relates to an electrical conduction path.

JP 2013-109935A discloses a high-voltage electrical conduction path for electrically connecting a battery and an inverter of a hybrid automobile, an electric automobile, or the like. The electrical conduction path has a concentrically laminated structure in which an elongated first conductor, serving as a positive electrode, is arranged at the center and is enclosed by a first insulator, the first insulator is enclosed by a second conductor, serving as a negative electrode, and the second conductor is enclosed by a second insulator. A terminal is fixed to an end portion of the first conductor. A terminal fitting is attached to an outer circumferential surface of the second conductor, a conductive member constituted by an electric wire is connected to the terminal fitting, and a terminal is fixed to the conductive member. The first conductor and the conductive member are arranged in parallel to each other, and are connected to the battery and the inverter.

SUMMARY

The above-described conventional electrical conduction path employs the terminal fitting fixed to the outer circumferential surface of the second conductor, as a means for connecting the second conductor and the conductive member, and the terminal fitting has an open barrel-shaped crimp portion to which the conductive member is fixed. Accordingly, the connection region between the second conductor and the conductive member has an outer diameter increased by the crimp portion and the conductive member, causing the problem that the diameter of the electrical conduction path as a whole is increased.

An exemplary aspect of the disclosure realizes a reduction in the diameter of an electrical conduction path.

According to the present disclosure, an electrical conduction path includes: a first conductor; a tubular first insulator that encloses the first conductor; a tubular second conductor that encloses the first insulator and has shape retainability; a branch conductor that is flexible so as to be deformable into a compact elongated shape and into an expanded tubular shape, the branch conductor deformed into the expanded tubular shape enclosing an outer circumferential surface of the second conductor; and a fixing member that fixes the branch conductor to the outer circumferential surface of the second conductor.

Since the branch conductor deformed into the expanded tubular shape is fixed to the outer circumferential surface of the second conductor, an increase in the outer diameter of the connection region between the second conductor and the branch conductor can be suppressed. Also, deforming the portion of the branch conductor that protrudes from the second conductor into a compact elongated shape can suppress an increase in the outer diameter of the electrical conduction path as a whole. Therefore, according to the present disclosure, it is possible to realize a reduction in the diameter of the electrical conduction path.

DETAILED DESCRIPTION OF EMBODIMENTS

The present disclosure may be such that the branch conductor is a braided wire obtained by braiding thin metal wires into a tubular shape. With this configuration, it is easy to deform the branch conductor into a compact elongated shape and into an expanded tubular shape.

According to the present disclosure, the electrical conduction path further includes an extended conductor connected to an end portion of the first conductor, wherein the fixing member encloses a connection region between the first conductor and the extended conductor. With this configuration, there is no risk that an external force acting in a bending direction will be exerted on the connection region between the first conductor and the extended conductor, making it possible to prevent, for example, damage to the connection region between the first conductor and the extended conductor.

Embodiment 1

Hereinafter, Embodiment 1 in which the present disclosure is embodied will be described with reference to FIGS. 1 and 2. Note that, in the following description, with respect to a front-rear direction, the left side in FIGS. 1 and 2 is defined as the front side.

Figure 1:
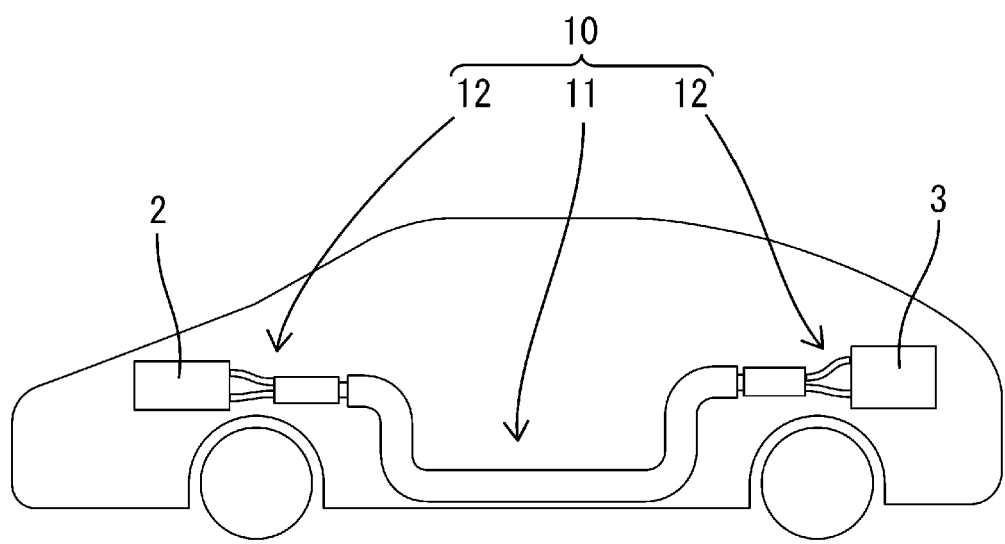
FIG. 1 is a schematic diagram illustrating a state in which an electrical conduction path according to Embodiment 1 is arranged in a vehicle.

As shown in FIG. 1, an electrical conduction path 10 of Embodiment 1 electrically connects an inverter 2 provided in an engine room of a vehicle 1 such as a hybrid automobile or an electric automobile, and a battery 3 provided in the rear portion of the vehicle 1. A high-voltage DC current flows through the electrical conduction path 10.

The electrical conduction path 10 is provided with a shape-retaining electrical conduction path 11 that keeps a wiring path constant due to its own rigidity and without being supported by another member, and a pair of flexible electrical conduction paths 12 that allow the wiring path to vary flexibly. The shape-retaining electrical conduction path 11 is laid in the front-rear direction from the vicinity of a front end portion of the vehicle 1 to the vicinity of a rear end portion. One of the flexible electrical conduction paths 12 is laid in the front end portion of the vehicle 1, and the other one of the flexible electrical conduction paths 12 is laid in the rear end portion of the vehicle 1.

Figure 2:
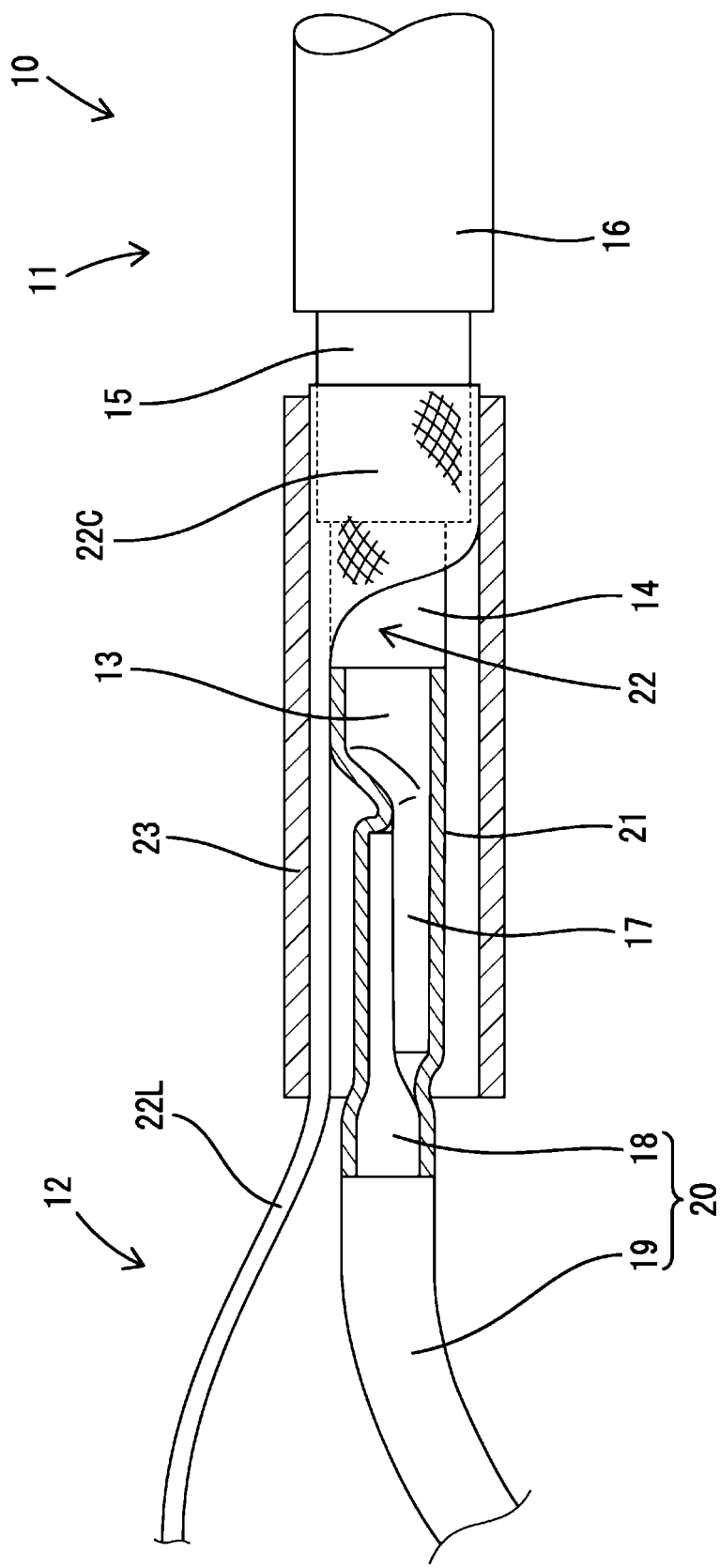
FIG. 2 is a partially enlarged lateral cross-sectional view of the electrical conduction path according to Embodiment 1.

As shown in FIG. 2, the shape-retaining electrical conduction path 11 has a front end portion to which a rear end portion (base end portion) of the flexible electrical conduction path 12 is connected so as to allow a current to flow therethrough, and a front end portion (leading end portion) of the flexible electrical conduction path 12 is connected to the inverter 2. The shape-retaining electrical conduction path 11 has a rear end portion to which a front end portion (base end portion) of a flexible electrical conduction path 12 is connected so as to allow a current to flow therethrough, and a rear end portion (leading end portion) of this flexible electrical conduction path 12 is connected to the battery 3. Note that the structure of the connection region between the rear end portion of the shape-retaining electrical conduction path 11 and the front end portion of the flexible electrical conduction path 12 is the same as the structure of the connection region between the front end portion of the shape-retaining electrical conduction path 11 and the rear end portion of the flexible electrical conduction path 12, and thus illustration thereof is omitted.

As shown in FIG. 2, the shape-retaining electrical conduction path 11 includes: a first conductor 13 having a circular cross-section; a cylindrical first insulating member 14 (first insulator) that concentrically encloses the first conductor 13, and is made of a synthetic resin; a cylindrical second conductor 15 that concentrically encloses the first insulating member 14; and a cylindrical second insulating member 16 that concentrically encloses the second conductor 15, and is made of a synthetic resin.

The first conductor 13 is a pipe, a single core wire, or the like that is made of metal (such as copper, a copper alloy, aluminum, or an aluminum alloy). If the first conductor 13 is a pipe or a single core wire, the first conductor 13 has shape retainability due to its own rigidity. In this context, "shape retainability" is defined as a property of having such rigidity that deformation due to gravity alone is not likely to occur.

The second conductor 15 has a structure such that it concentrically encloses the first conductor 13 via the first insulating member 14. The second conductor 15 is a pipe made of metal (such as copper, a copper alloy, aluminum, or an aluminum alloy), and thus has shape retainability.

At the front end portion of the shape-retaining electrical conduction path 11, the front end portions of the second insulating member 16, the second conductor 15, and the first insulating member 14 are stripped by different lengths. Accordingly, the front end portion of the second conductor 15 protrudes forward from the front end of the second insulating member 16 while being exposed, the front end portion of the first insulating member 14 protrudes forward from the front end of the second conductor 15 while being exposed, and the front end portion of the first conductor 13 protrudes forward from the front end of the first insulating member 14 while being exposed. The front end portion of the first conductor 13 is pressed into a flat shape (plate shape) so as to serve as a plate-shaped connection portion 17.

The flexible electrical conduction path 12 includes: an extended conductor 18; an insulating tube 21, a branch conductor 22; and a fixing member 23. The extended conductor 18 is composed of twisted wires made of metal (such as copper, a copper alloy, aluminum, or an aluminum alloy). The extended conductor 18 is enclosed by an insulating cover 19 to constitute a covered wire 20. The rear end portion of the extended conductor 18 is exposed as a result of the insulating cover 19 being stripped.

The exposed rear end portion of the extended conductor 18 is soldered (welded) in a state of being placed on the plate-shaped connection portion 17 of the first conductor 13. With this, the extended conductor 18 and the first conductor 13 are fixed to each other so as to allow a current to flow therethrough, and the extended conductor 18 is drawn forward from the front end portion of the first conductor 13. Note that, since the first conductor 13 and the extended conductor 18 are in direct contact with each other, the same material is preferably used for them in order to prevent electrical corrosion.

The entire region of the first conductor 13 that is exposed from the front end of the first insulating member 14, and the entire region of the extended conductor 18 that is exposed from the rear end of the insulating cover 19 are enclosed in a liquid-tight manner by the insulating tube 21, which is formed of a heat shrinkable tube. The insulating tube 21 encloses the connection region between the first conductor 13 and the extended conductor 18.

The branch conductor 22 is a braided wire made of metal (such as copper, a copper alloy, aluminum, or an aluminum alloy). "Braided wires" refer to a plurality of thin metal wires braided in a net-like fashion, and thus are flexible. The branch conductor 22 is freely deformable into a compact elongated shape like the extended conductor 18, and into an expanded tubular shape. The rear end portion of the branch conductor 22 has an expanded tubular shape to serve as a tubular connection portion 22C. The tubular connection portion 22C is attached to and encloses the region of the outer circumferential surface of the second conductor 15 that is exposed from the second insulating member 16.

The fixing member 23 is a pipe that is made of metal (such as copper, a copper alloy, aluminum, or an aluminum alloy). The fixing member 23 encloses: the region of the second conductor 15 that is covered by the branch conductor 22; the entire exposed region of the first insulating member 14; and an exposed region of the first conductor 13 (entire region enclosed by the insulating tube 21).

The rear end portion of the fixing member 23 is crimped and deformed to have a reduced diameter, and due to the crimping process, the rear end portion of the branch conductor 22 is firmly pressed in a radial direction while being interposed between the outer circumferential surface of the second conductor 15 and the rear end portion of the fixing member 23. Accordingly, the second conductor 15 and the branch conductor 22 are connected to each other so as to allow a current to flow therethrough. Note that the second conductor 15 and the branch conductor 22 are in direct contact with each other, and the branch conductor 22 and the fixing member 23 are in direct contact with each other. Accordingly, the same type of metal is preferably used for the second conductor 15, the branch conductor 22, and the fixing member 23 in order to prevent electrical corrosion.

The branch conductor 22 that is fixed by the fixing member 23 to the front end portion of the second conductor 15 is laid while being drawn forward from the second conductor 15. The region of the branch conductor 22 that is drawn forward from the second conductor 15 serves as a linear wiring portion 22L, which is compact and elongated like the extended conductor 18. The linear wiring portion 22L of the branch conductor 22 is laid along the inner circumferential surface of the fixing member 23 and the outer circumferential surface of the insulating tube 21, and is drawn from the front end of the fixing member 23 along the extended conductor 18.

The region of the branch conductor 22 (linear wiring portion 22L) that is drawn forward from the fixing member 23 may be enclosed by an insulating covering material (not shown). The covering material may enclose not only the branch conductor 22 but also the fixing member 23. The covering material may also be designed to enclose the second insulating member 16.

The extended conductor 18 and the linear wiring portion 22L (branch conductor 22) are suitably bent and laid in a wiring space of the front end portion of the vehicle 1. The front end portion of the extended conductor 18 and the front end portion of the branch conductor 22 are respectively connected to a positive-side terminal (not shown) and a negative-side terminal (not shown) of the inverter 2. With respect to the flexible electrical conduction path 12 connected to the rear end portion of the shape-retaining electrical conduction path 11, the extended conductor 18 and the linear wiring portion 22L of the branch conductor 22 are suitably bent and laid in a wiring space of the rear end portion of the vehicle 1. The rear end portion of the extended conductor 18 and the rear end portion of the linear wiring portion 22L are respectively connected to a positive-side terminal (not shown) and a negative-side terminal (not shown) of the battery 3.

The electrical conduction path 10 of Embodiment 1 includes: the first conductor 13; the tubular first insulating member 14 that encloses the first conductor 13; the tubular second conductor 15 that encloses the first insulating member 14 and has shape retainability; the branch conductor 22; and the fixing member 23. The branch conductor 22 is flexible so as to be deformable into a compact elongated shape and into an expanded tubular shape, the branch conductor 22 deformed into the expanded tubular shape enclosing the outer circumferential surface of the second conductor 15. The fixing member 23 has a function of fixing the branch conductor 22 to the outer circumferential surface of the second conductor 15.

Since the branch conductor 22 deformed into the expanded tubular shape is fixed to the outer circumferential surface of the second conductor 15, an increase in the outer diameter of the connection region between the second conductor 15 and the branch conductor 22 can be suppressed. Also, since the portion of the branch conductor 22 that protrudes from the second conductor 15 has a compact elongated shape, an increase in the outer diameter of the electrical conduction path 10 as a whole can be suppressed even if the compact elongated branch conductor 22 is laid along the extended conductor 18. Therefore, it is possible to realize a reduction in the diameter of the electrical conduction path 10 of Embodiment 1.

Furthermore, since the branch conductor 22 is a braided wire obtained by braiding thin metal wires into a tubular shape, it is easy to deform the branch conductor 22 into a compact elongated shape and into an expanded tubular shape. Moreover, the extended conductor 18 is connected to an end portion of the first conductor 13, and the fixing member 23 encloses the connection region between the first conductor 13 and the extended conductor 18. With this configuration, there is no risk that an external force acting in a bending direction will be exerted on the connection region between the first conductor 13 and the extended conductor 18, making it possible to prevent, for example, damage to the connection region between the first conductor 13 and the extended conductor 18.

Embodiment 2

Figure 3:
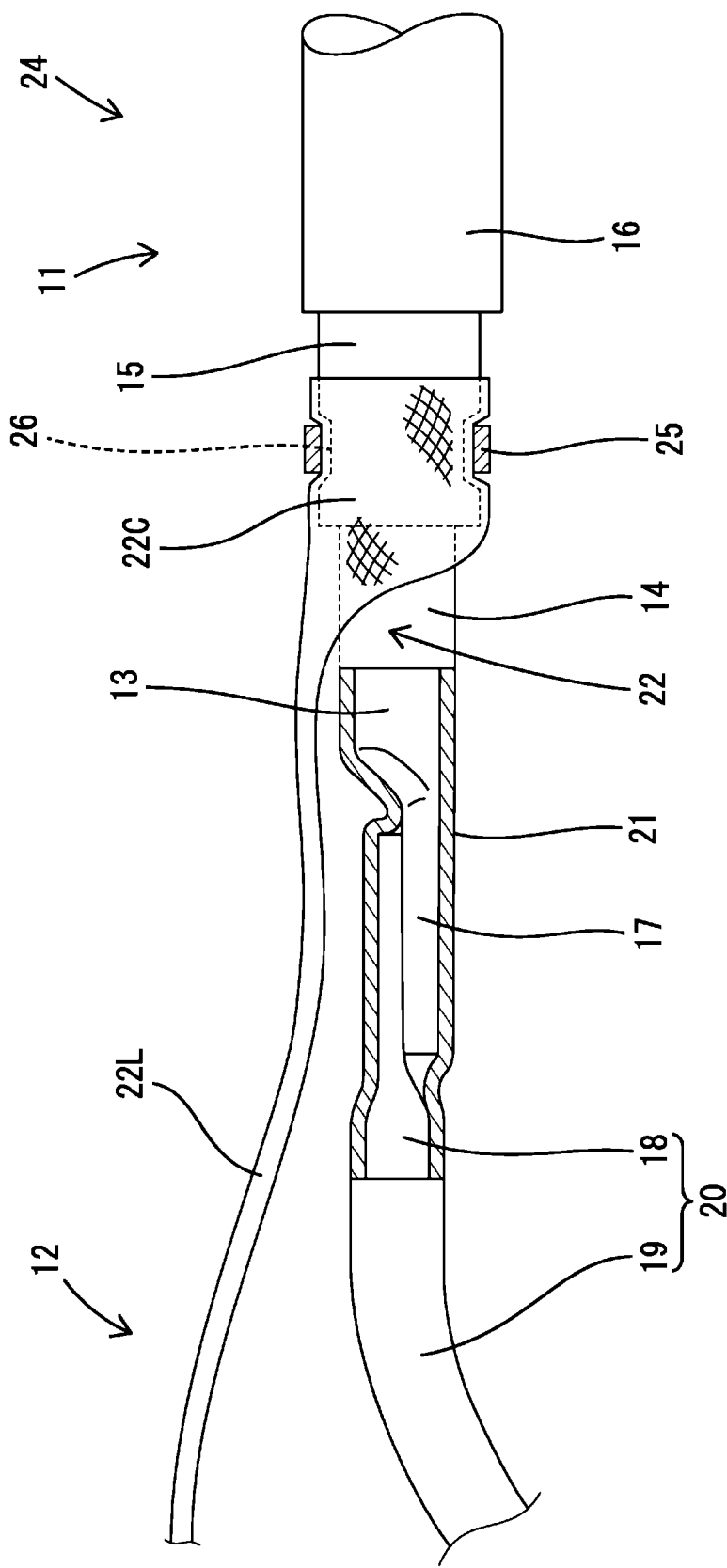
FIG. 3 is a partially enlarged lateral cross-sectional view of an electrical conduction path according to Embodiment 2.

Hereinafter, Embodiment 2 in which the present disclosure is embodied will be described with reference to FIG. 3. An electrical conduction path 24 of Embodiment 2 differs from Embodiment 1 due to a fixing member 25 with a different configuration. Other configurations are the same as those of Embodiment 1, and thus the same reference numerals are given to the same configurations, and descriptions of their structures, functions, and effects are omitted.

The fixing member 23 of Embodiment 1 is cylindrical so as to enclose not only the front end portion of the second conductor 15 and the rear end portion of the branch conductor 22 but also the connection region between the first conductor 13 and the extended conductor 18, whereas the fixing member 25 of Embodiment 2 is ring-shaped and only covers part of the front end portion of the second conductor 15 and part of the rear end portion of the branch conductor 22. The fixing member 25 is made of the same metal material as that of the second conductor 15 and the branch conductor 22, and is crimped and deformed to have a reduced diameter.

By crimping the fixing member 25, the rear end portion of the branch conductor 22 is firmly pressed in a radial direction while being interposed between the second conductor 15 and the fixing member 25, and the second conductor 15 and the branch conductor 22 are fixed to each other so as to allow a current to flow therethrough. Furthermore, in the region of the outer circumferential surface of the second conductor 15 to which the fixing member 25 is externally fitted, a groove portion 26 is formed that is recessed over the entire circumference by crimping and deforming the fixing member 25. The groove portion 26 accommodates the branch conductor 22 and the fixing member 25. Accordingly, the outer diameter of the fixing member 25 in a state in which the branch conductor 22 is fixed to the second conductor 15 is substantially the same as the outer diameter of the region of the second conductor 15 in which no groove portion 26 is formed.

Other Embodiments

The present disclosure is not limited to the embodiments described in the above description with reference to the drawings, and the technical scope of the present disclosure encompasses, for example, the following embodiments.
(1) Although, in Embodiments 1 and 2, the fixing member is a single member, the fixing member may also be obtained by integrating a plurality of components in a radial direction.
(2) Although, in Embodiments 1 and 2, the first conductor is a single core wire, the first conductor may also be twisted wires or a pipe that are/is made of metal.
(3) Although, in Embodiments 1 and 2, the first conductor and the extended conductor are fixed to each other through welding, the first conductor and the extended conductor may also be connected to each other via a terminal fitting.
(4) Although, in Embodiments 1 and 2, a heat shrinkable tube is used as a means for enclosing the connection region between the first conductor and the extended conductor in an insulated state, any member or means other than the heat shrinkable tube may also be used as the means for enclosing the connection region between the first conductor and the extended conductor in an insulated state.
(5) Although, in Embodiments 1 and 2, the extended conductor is connected to the first conductor, and is connected to the inverter and the battery, the first conductor may also be connected to the inverter and the battery directly without using the extended conductor.
(6) Although, in Embodiments 1 and 2, the braided wire obtained by braiding thin metal wires into a tubular shape is used as the branch conductor, the branch conductor may also be a conductive member other than the braided wire.
(7) Although, in Embodiment 1, the fixing member has the shape of a tube extending over the entire circumference, the fixing member may also have a cross-section that is substantially C-shaped with a slit formed in an axial direction.
(8) Although, in Embodiment 1, the fixing member encloses the connection region between the first conductor and the extended conductor, the fixing member may also have a structure such that it does not enclose the connection region between the first conductor and the extended conductor.
(9) Although, in Embodiment 2, almost the entire fixing member is accommodated in the recessed portion formed in the outer circumferential surface of the second conductor in a state in which the branch conductor is fixed to the second conductor, the configuration is not limited to this, and almost the entire fixing member may also protrude in a radial direction from the outer circumferential surface of the second conductor in the state in which the branch conductor is fixed to the second conductor.

(10) Although, in Embodiment 2, the fixing member has the shape of a ring extending over the entire circumference, the fixing member may also have a cross-section that is substantially C-shaped.

(11) Although, in Embodiment 2, the fixing member does not enclose the connection region between the first conductor and the extended conductor, the fixing member may also have a structure such that it encloses the connection region between the first conductor and the extended conductor.

The invention claimed is:

1. An electrical conduction path comprising:
    a first conductor;
    a tubular first insulator that encloses the first conductor;
    a tubular second conductor that encloses the first insulator, and has shape retainability;
    a branch conductor that is flexible and deformed into (i) a first portion having a compact elongated shape and (ii) a second portion different from the first portion, the second portion having an expanded tubular shape and enclosing an outer circumferential surface of the second conductor,
    wherein an outer circumferential surface of the first portion and an outer circumferential surface of the second portion are continuous with each other; and
    a fixing member that fixes the branch conductor to the outer circumferential surface of the second conductor,
    wherein the fixing member is a pipe that encloses and is in direct contact with both the first portion and the second portion of the branch conductor.

2. The electrical conduction path according to claim 1, wherein the branch conductor is a braided wire obtained by braiding thin metal wires into a tubular shape.

3. The electrical conduction path according to claim 1, further comprising:
    an extended conductor connected to an end of the first conductor,
    wherein the fixing member encloses a connection region between the first conductor and the extended conductor.

4. The electrical conduction path according to claim 1, wherein the first portion having the compact elongated shape is positioned on one side with respect to the outer circumferential surface of the second conductor.

* * * * *